(12) United States Patent
Horiguchi et al.

(10) Patent No.: US 10,083,712 B2
(45) Date of Patent: Sep. 25, 2018

(54) METHOD FOR MANUFACTURING MAGNETIC CORE MODULE IN MAGNETIC HEAD, MAGNETIC CORE MODULE IN MAGNETIC HEAD AND MAGNETIC HEAD

(71) Applicant: TECHRECO COMPANY, LIMITED, Kawasaki-shi, Kanagawa (JP)

(72) Inventors: Masao Horiguchi, Tokyo (JP); Ruining Gao, Beijing (CN)

(73) Assignee: TECHRECO COMPANY LIMITED, Kanagawa (JP)

( * ) Notice: Subject to any disclaimer, the term of this patent is extended or adjusted under 35 U.S.C. 154(b) by 0 days.

(21) Appl. No.: 15/667,721

(22) Filed: Aug. 3, 2017

(65) Prior Publication Data
US 2017/0365278 A1  Dec. 21, 2017

Related U.S. Application Data

(62) Division of application No. 14/647,565, filed as application No. PCT/JP2013/081716 on Nov. 26, 2013, now Pat. No. 9,761,251.

(30) Foreign Application Priority Data

Nov. 28, 2012 (CN) .......................... 2012 1 0493620
Nov. 28, 2012 (CN) .................... 2012 2 0638765 U
(Continued)

(51) Int. Cl.
*G11B 5/10* (2006.01)
*G11B 5/17* (2006.01)
(Continued)

(52) U.S. Cl.
CPC ............... *G11B 5/17* (2013.01); *G06K 7/082* (2013.01); *G06K 7/083* (2013.01); *G06K 7/084* (2013.01);
(Continued)

(58) Field of Classification Search
None
See application file for complete search history.

(56) References Cited

U.S. PATENT DOCUMENTS

| 5,586,385 A | 12/1996 | Nishino et al. |
| 9,761,251 B2 * | 9/2017 | Horiguchi ............ G11B 5/1475 |
| 2011/0192903 A1 * | 8/2011 | Berthiaud .............. G06K 7/084 235/449 |

FOREIGN PATENT DOCUMENTS

| CN | 203157018 U | 8/2013 |
| GB | 693347 A | 6/1953 |

(Continued)

OTHER PUBLICATIONS

International Search Report dated Jan. 28, 2014 for PCT/JP2013/081716 to Techreco Company, Limited filed Nov. 26, 2013.

*Primary Examiner* — William J Klimowicz
(74) *Attorney, Agent, or Firm* — Vorys, Sater, Seymour and Pease LLP

(57) ABSTRACT

A method for manufacturing a magnetic core module in a magnetic head, the magnetic core module and the magnetic head. The method for manufacturing the magnetic core module includes: a process for placing a magnetic core group in a holder mold cavity as an insert; and a process for injection-molding in the holder mold cavity. A method for manufacturing the magnetic core module allows the magnetic core group and the holder to be integrally injection-molded with a method of injection molding which uses the magnetic core group as an insert. The method simplifies the process of manufacturing a magnetic head to improve production efficiency, and saves labor and production costs. Further, the method prevents failures such as positional displacement and scattering of magnetic cores, which tends to occur when assembling thin and small magnetic cores, and ensures an ideal yield for a product.

13 Claims, 15 Drawing Sheets

(30) Foreign Application Priority Data

| Jan. 15, 2013 | (CN) | 2013 1 0014354 |
| Jan. 15, 2013 | (CN) | 2013 2 0020392 U |
| Aug. 30, 2013 | (CN) | 2013 1 0388400 |
| Aug. 30, 2013 | (CN) | 2013 1 0388426 |
| Aug. 30, 2013 | (CN) | 2013 2 0537401 U |
| Aug. 30, 2013 | (CN) | 2013 2 0537468 U |

(51) Int. Cl.
    *G06K 7/08*     (2006.01)
    *G11B 5/008*     (2006.01)
    *H01F 7/20*     (2006.01)
    *G11B 5/147*     (2006.01)
    *H01F 41/00*     (2006.01)
    *G11B 5/127*     (2006.01)
    *H01F 7/06*     (2006.01)

(52) U.S. Cl.
    CPC ........ *G11B 5/00808* (2013.01); *G11B 5/1475* (2013.01); *H01F 7/20* (2013.01); *H01F 41/005* (2013.01); *G11B 5/1272* (2013.01); *H01F 2007/062* (2013.01)

(56) References Cited

FOREIGN PATENT DOCUMENTS

| GB | 794975 | A | | 5/1958 |
|----|--------|---|---|--------|
| GB | 797942 | A | | 7/1958 |
| GB | 810929 | A | | 3/1959 |
| GB | 987695 | A | | 3/1965 |
| GB | 1009341 | A | | 11/1965 |
| JP | 55038640 | A | | 3/1980 |
| JP | 55038657 | A | * | 3/1980 |
| JP | 55113118 | A | * | 9/1980 |
| JP | S56152931 | U | | 11/1981 |
| JP | S57169912 | A | | 10/1982 |
| JP | 58177516 | A | | 10/1983 |
| JP | 59005411 | A | | 1/1984 |
| JP | 59013317 | A | | 1/1984 |
| JP | S59154619 | A | | 9/1984 |
| JP | 60083208 | A | | 5/1985 |
| JP | 61289506 | A | | 12/1986 |
| JP | 62120614 | A | | 6/1987 |
| JP | 63052309 | A | * | 3/1988 |
| JP | 01055711 | A | | 3/1989 |
| JP | H0289604 | U | | 7/1990 |
| JP | 02302909 | A | | 12/1990 |
| JP | 03185618 | A | | 8/1991 |
| JP | 04056304 | A | | 2/1992 |
| JP | 04347561 | A | | 12/1992 |
| JP | H5-020621 | A | | 1/1993 |
| JP | 05258220 | A | * | 10/1993 |
| JP | 05325127 | A | | 12/1993 |
| JP | 07110908 | A | | 4/1995 |
| JP | 07320218 | A | * | 12/1995 |
| JP | 08082844 | A | * | 3/1996 |
| JP | 10188210 | A | | 7/1998 |
| JP | H1173609 | A | | 3/1999 |
| JP | 2002025212 | A | | 1/2002 |
| JP | 2002170203 | A | | 6/2002 |
| JP | 2007184529 | A | | 7/2007 |
| SU | 0672648 | A1 | | 7/1979 |
| SU | 995117 | A1 | | 2/1983 |

\* cited by examiner

[FIG. 1]
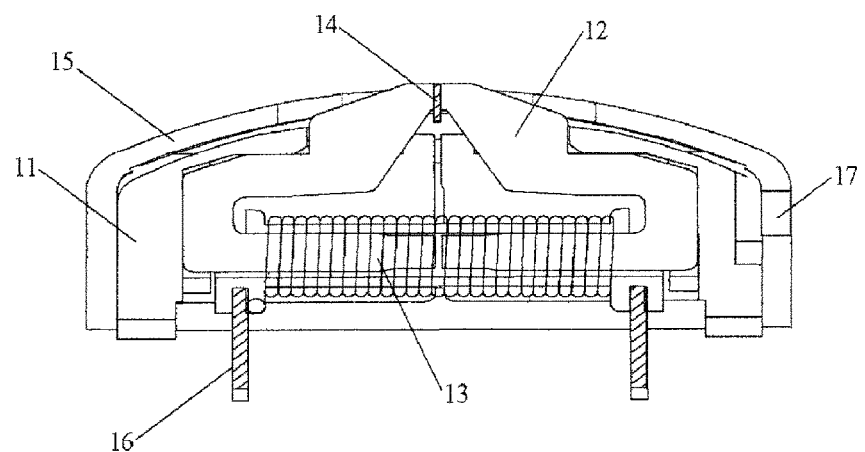
[FIG. 2]
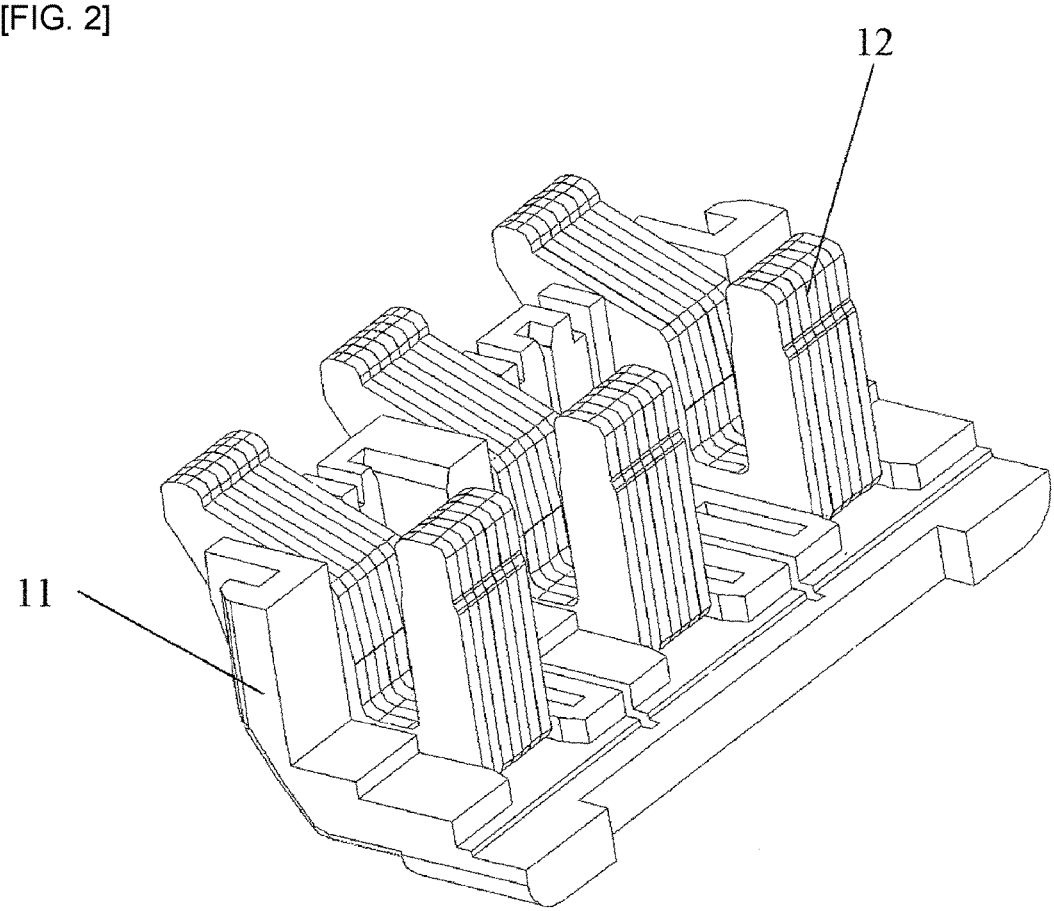

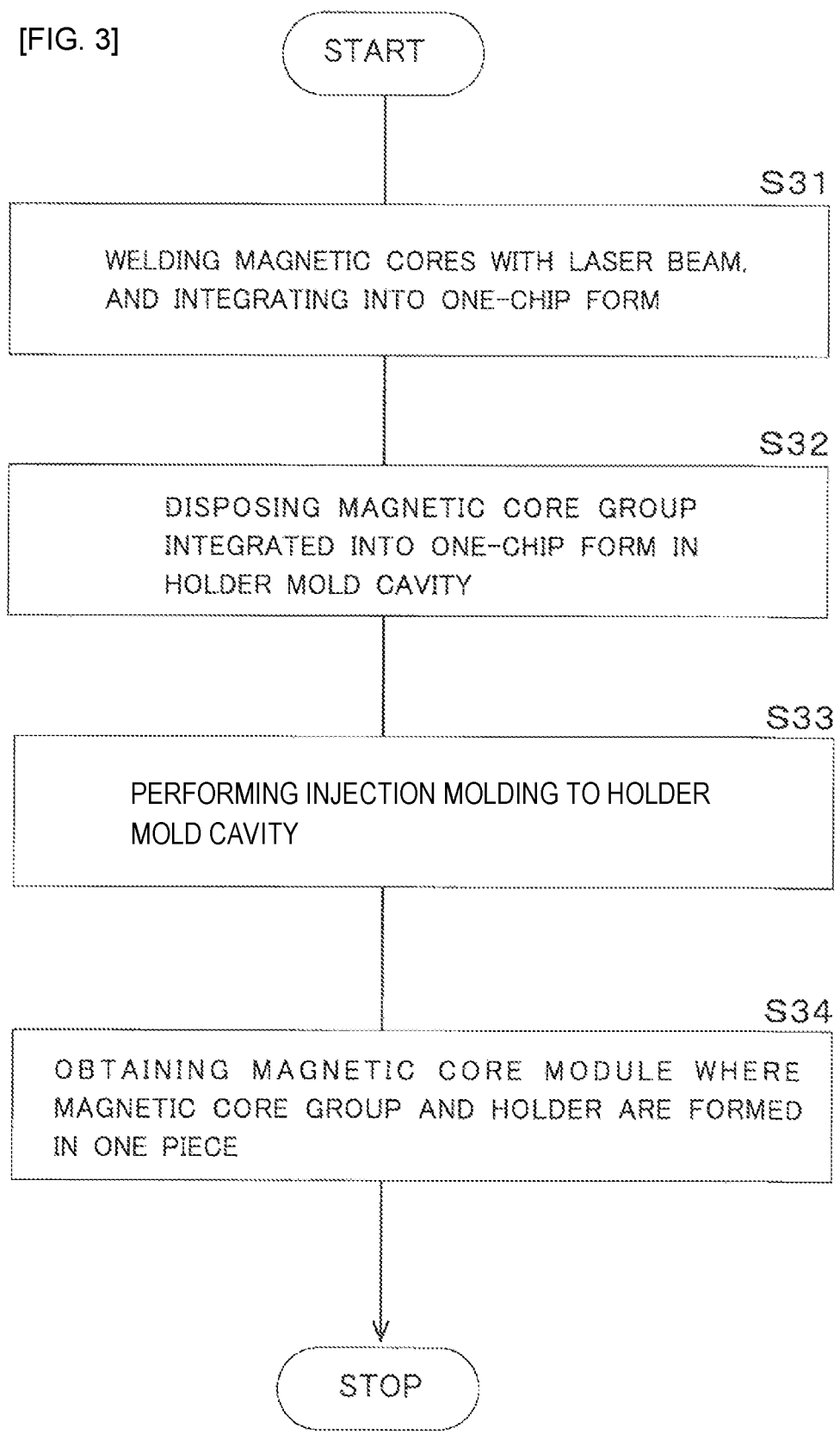

[FIG. 4]
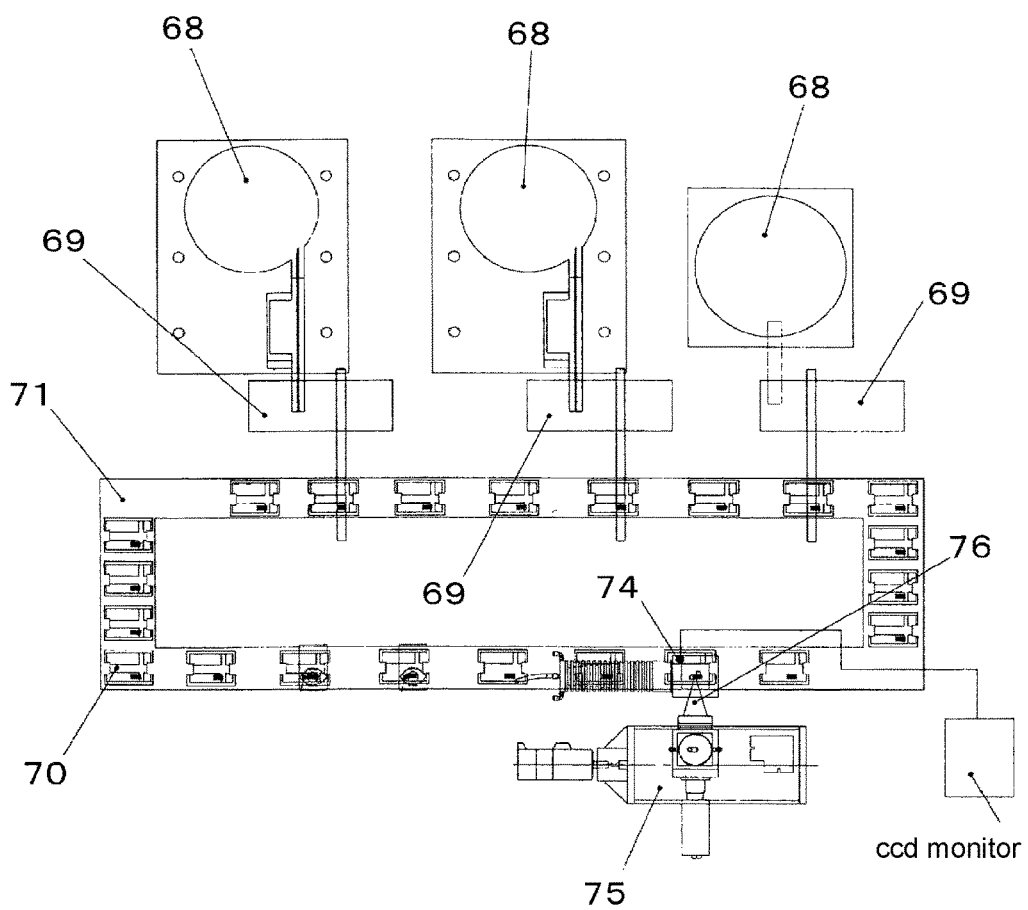

[FIG. 5]
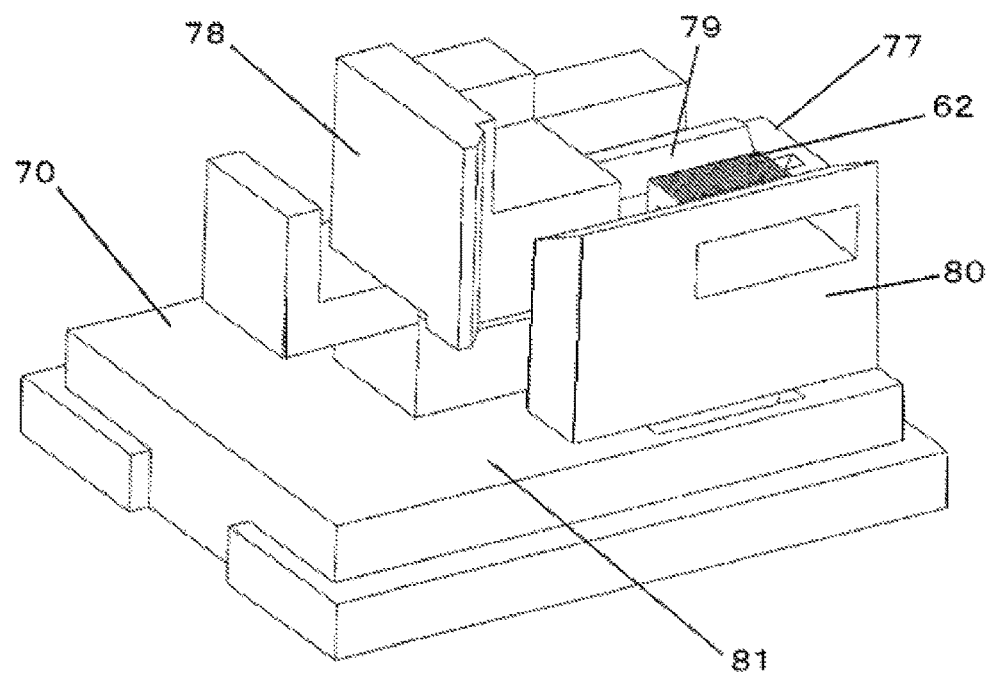

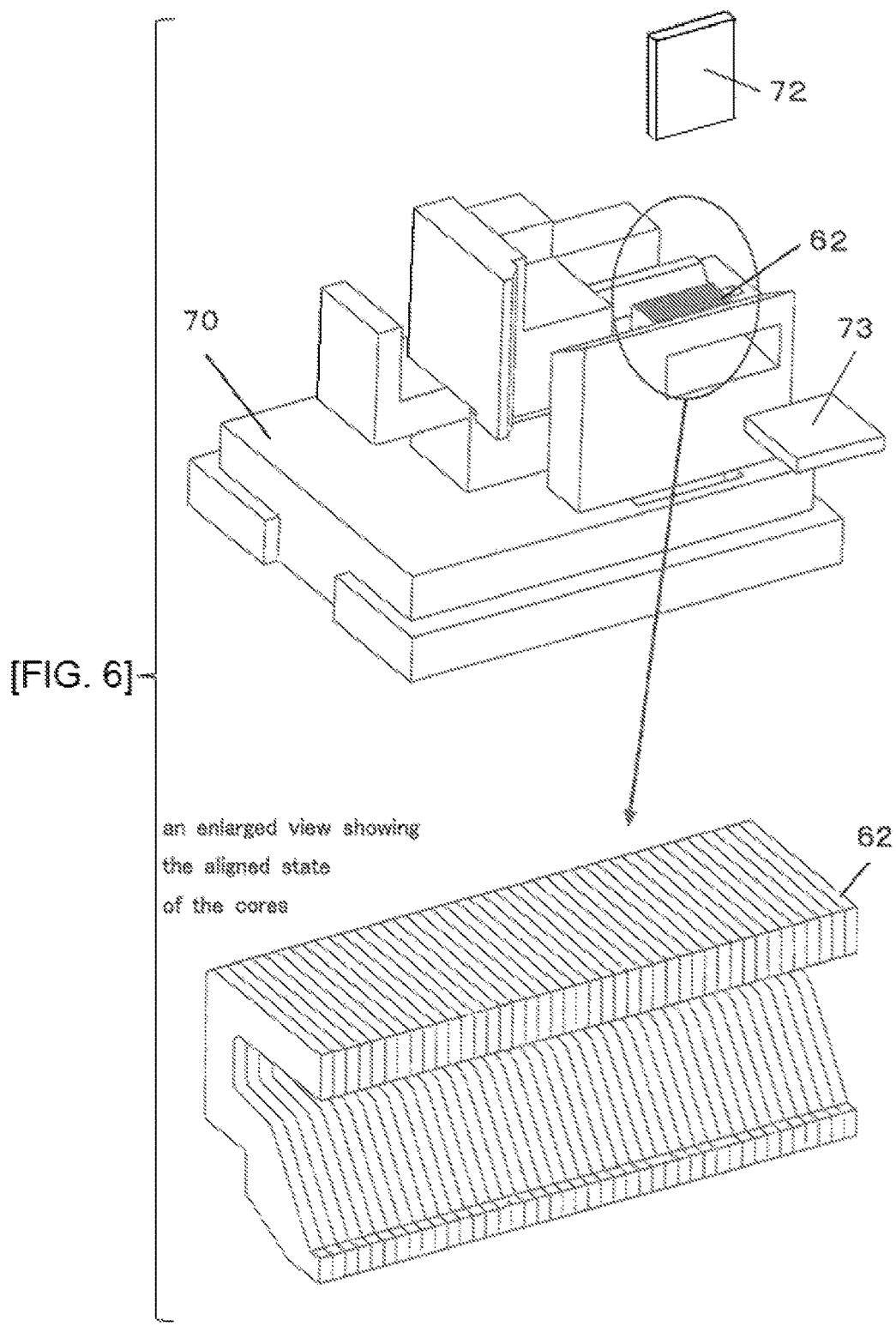

[FIG. 7]
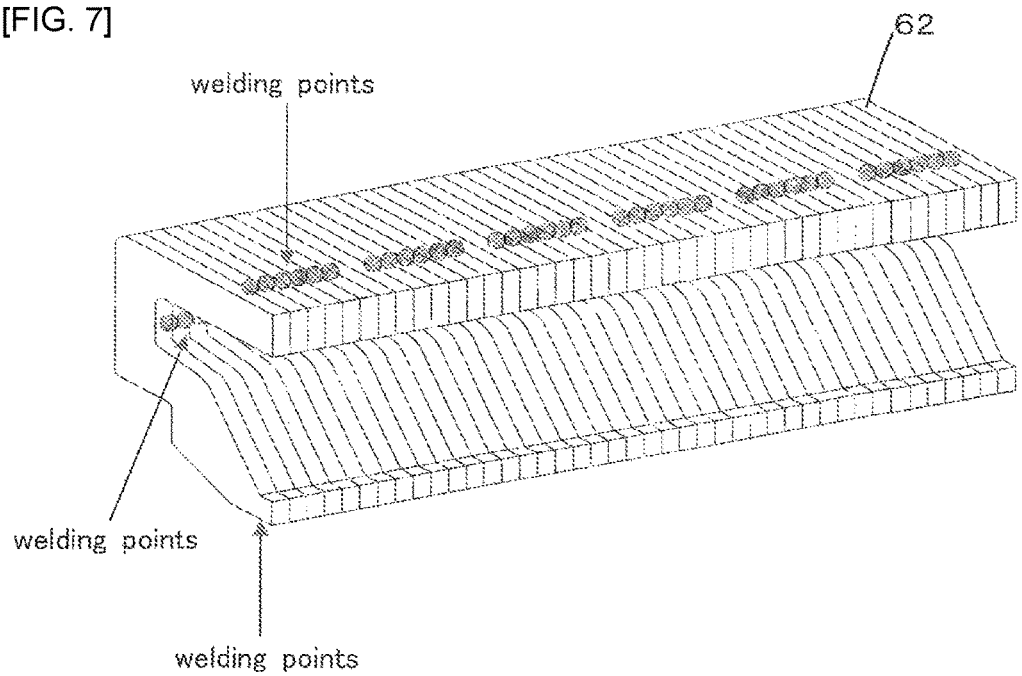
[FIG. 8]
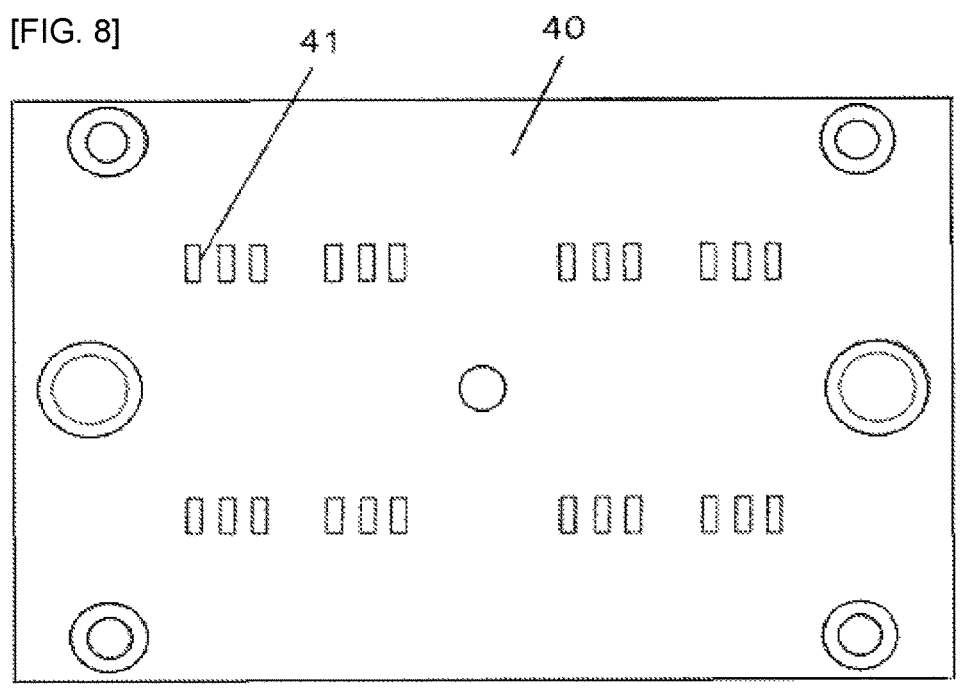

[FIG. 9]
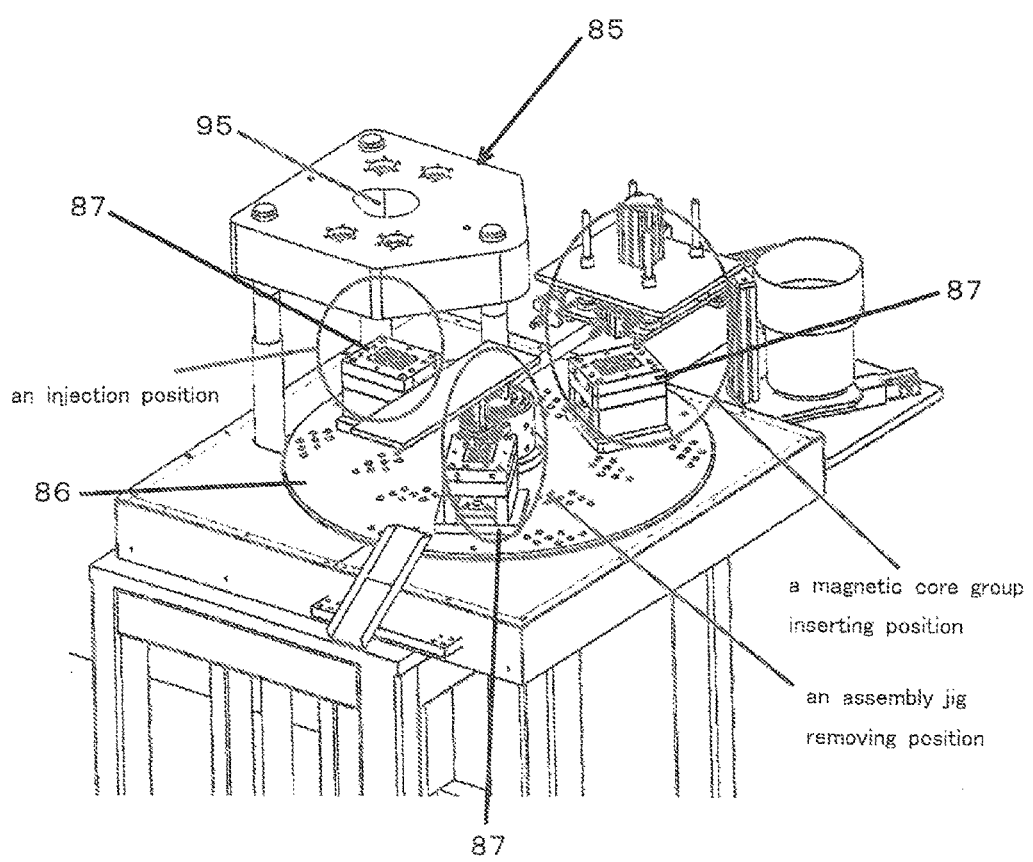

[FIG. 10]
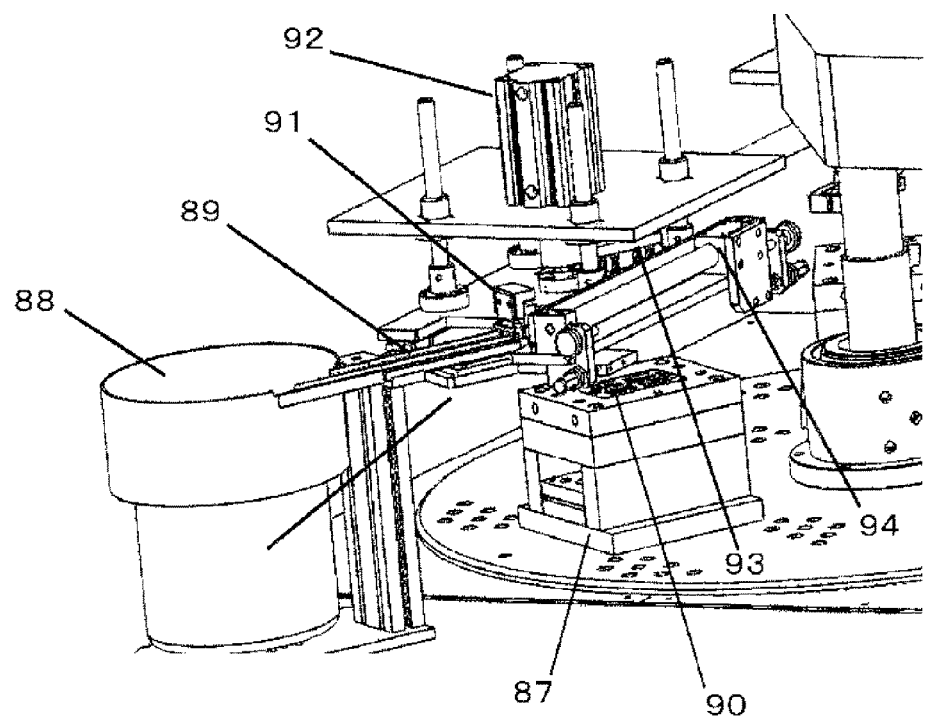
[FIG. 11]
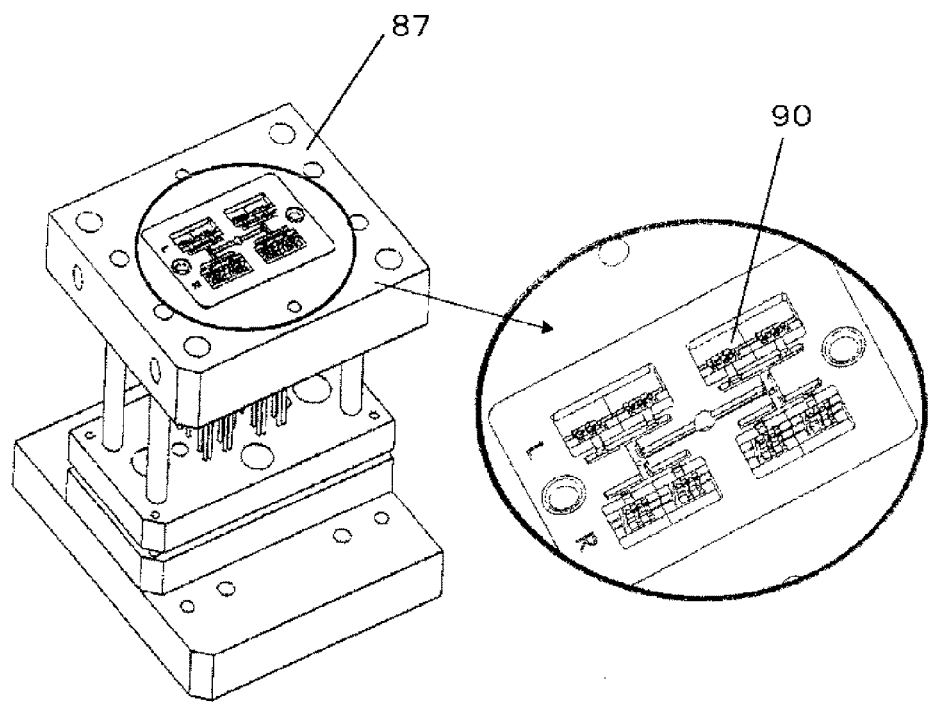

[FIG. 12]
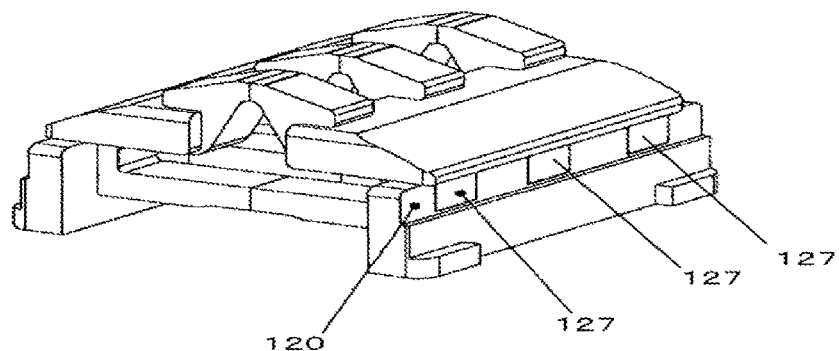
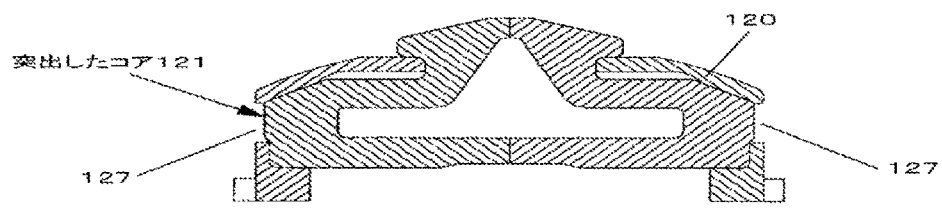
[FIG. 13]
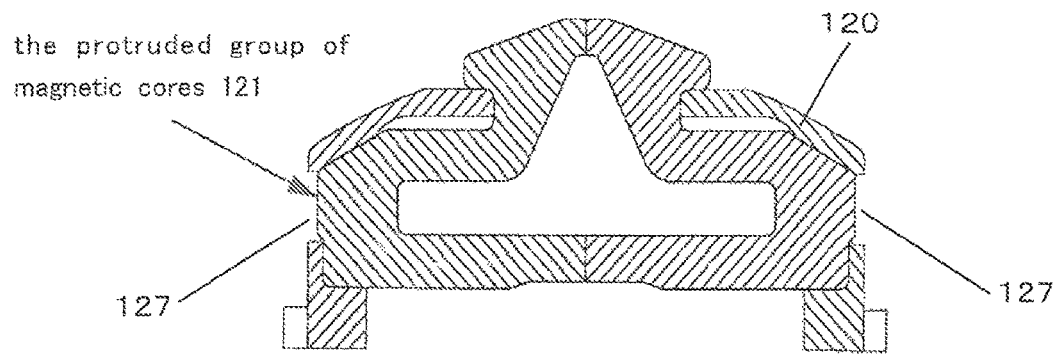

[FIG. 14]
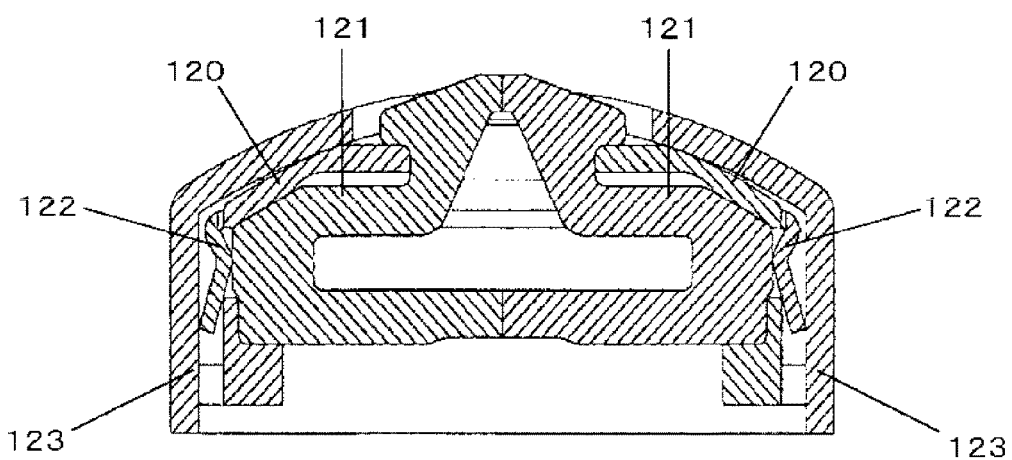
[FIG. 15]
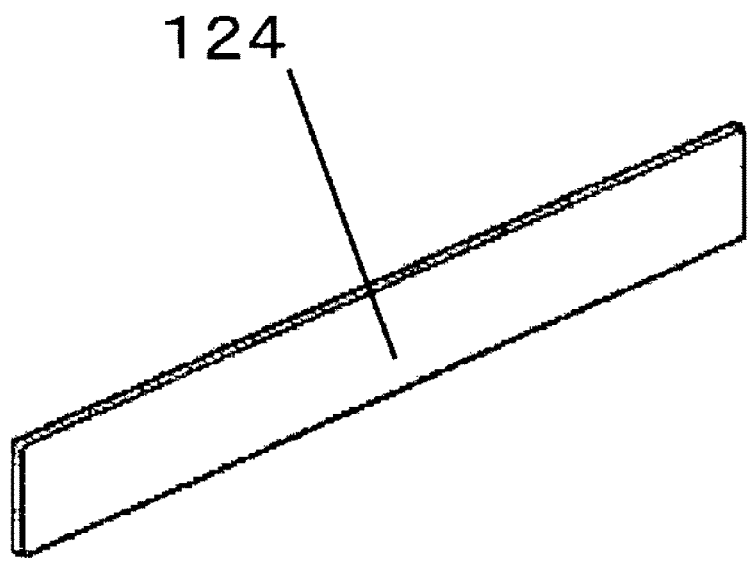

[FIG. 16]
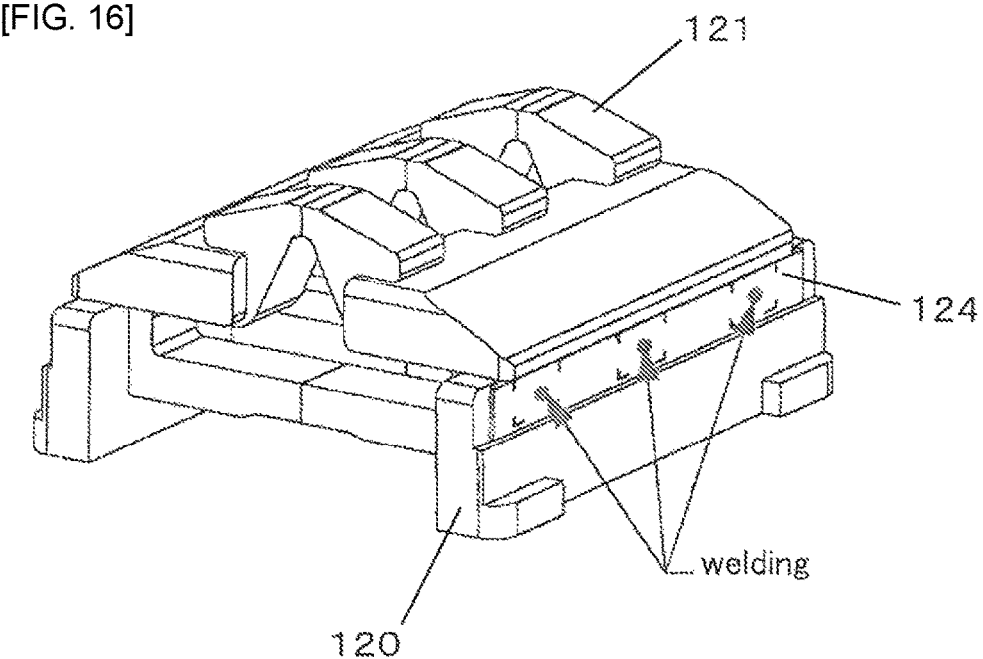
[FIG. 17]
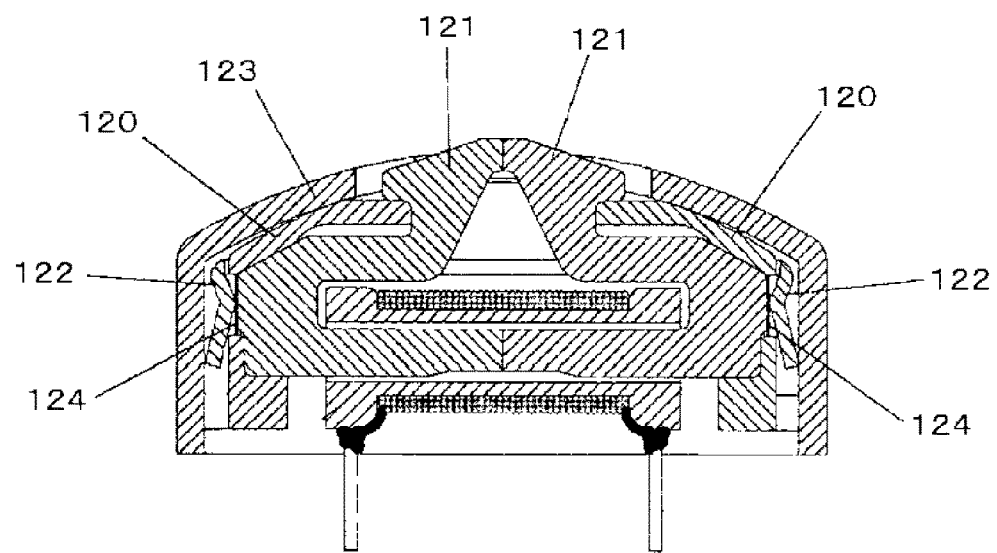

[FIG. 18]
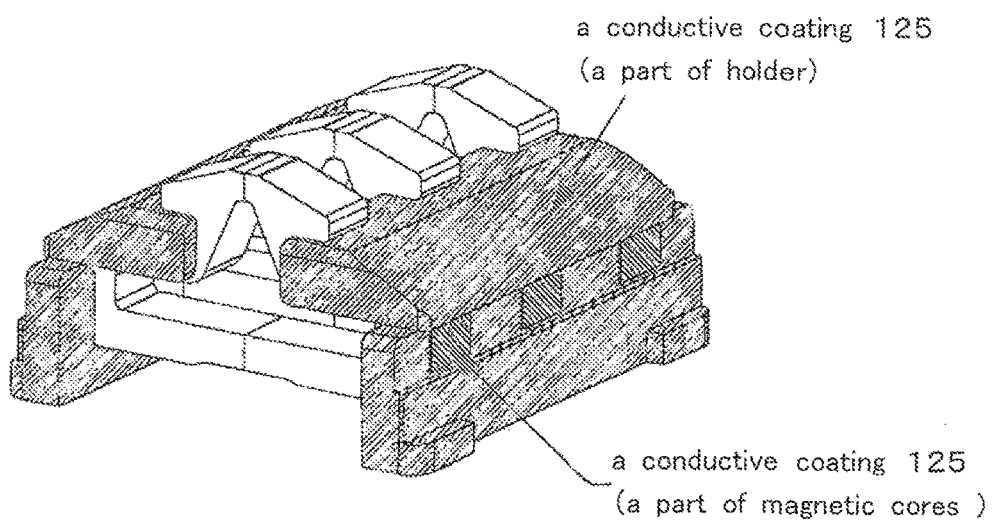

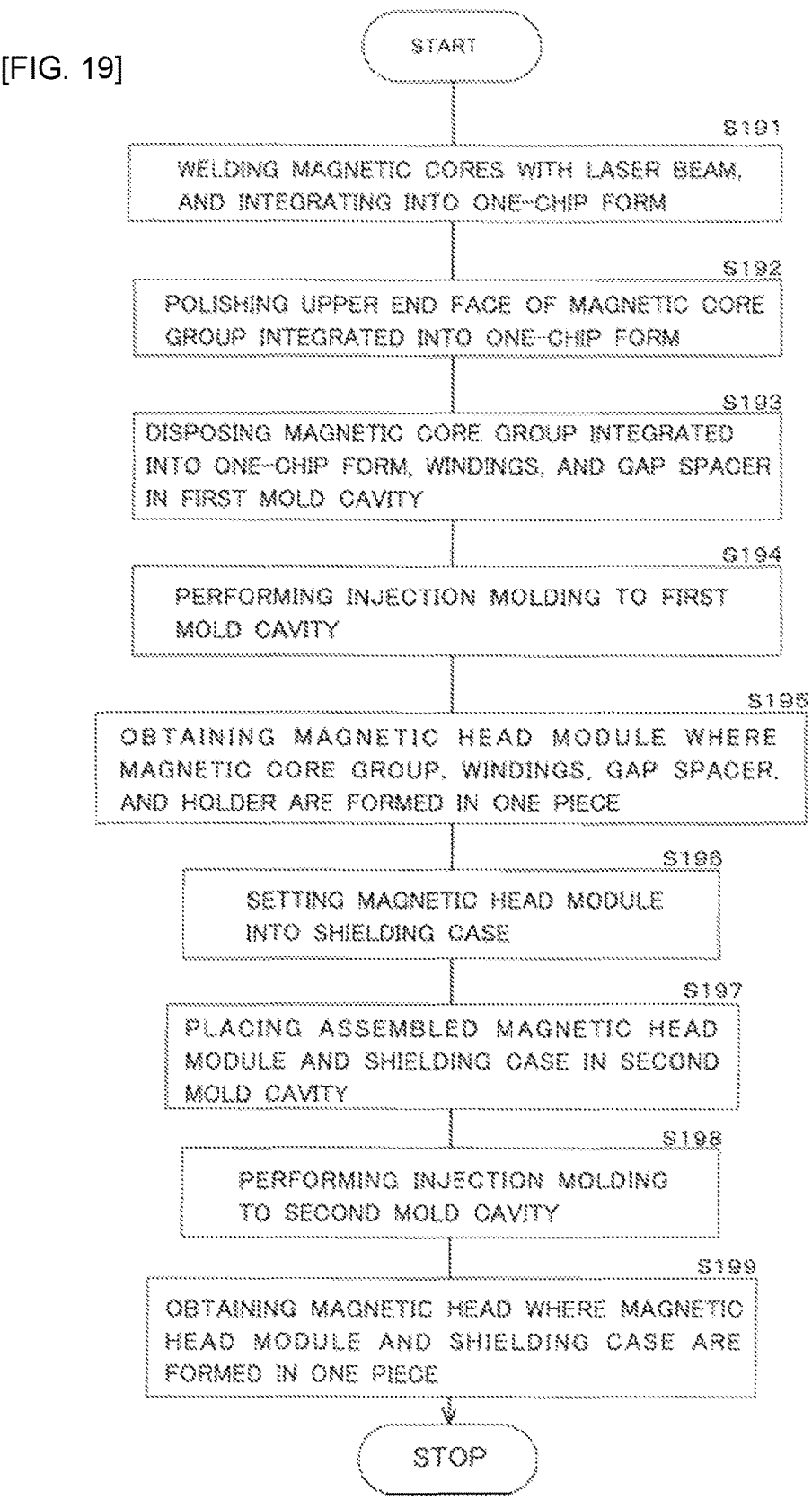
[FIG. 19]

[FIG. 20]
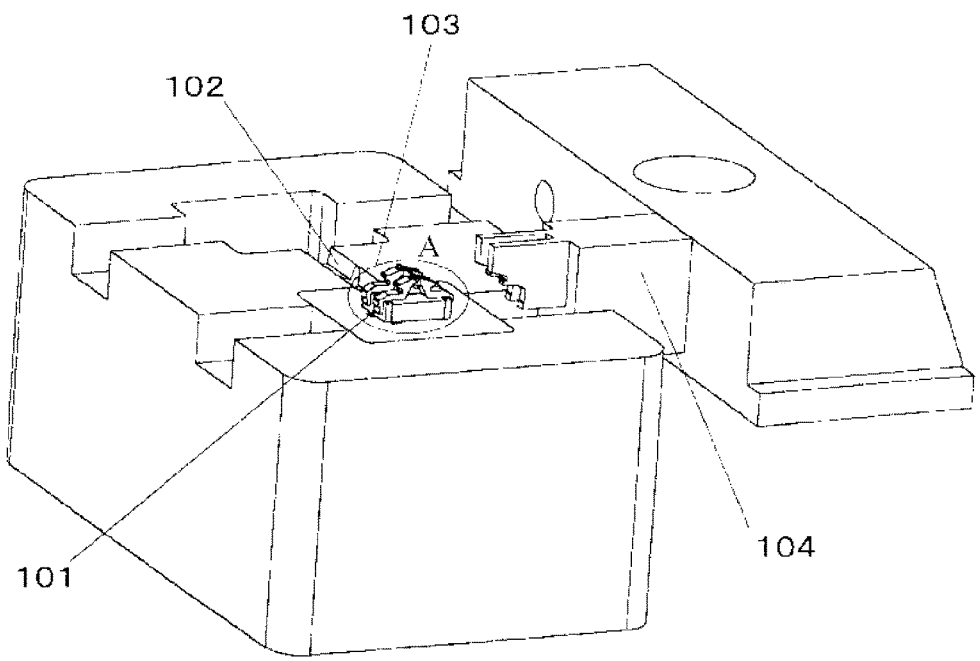

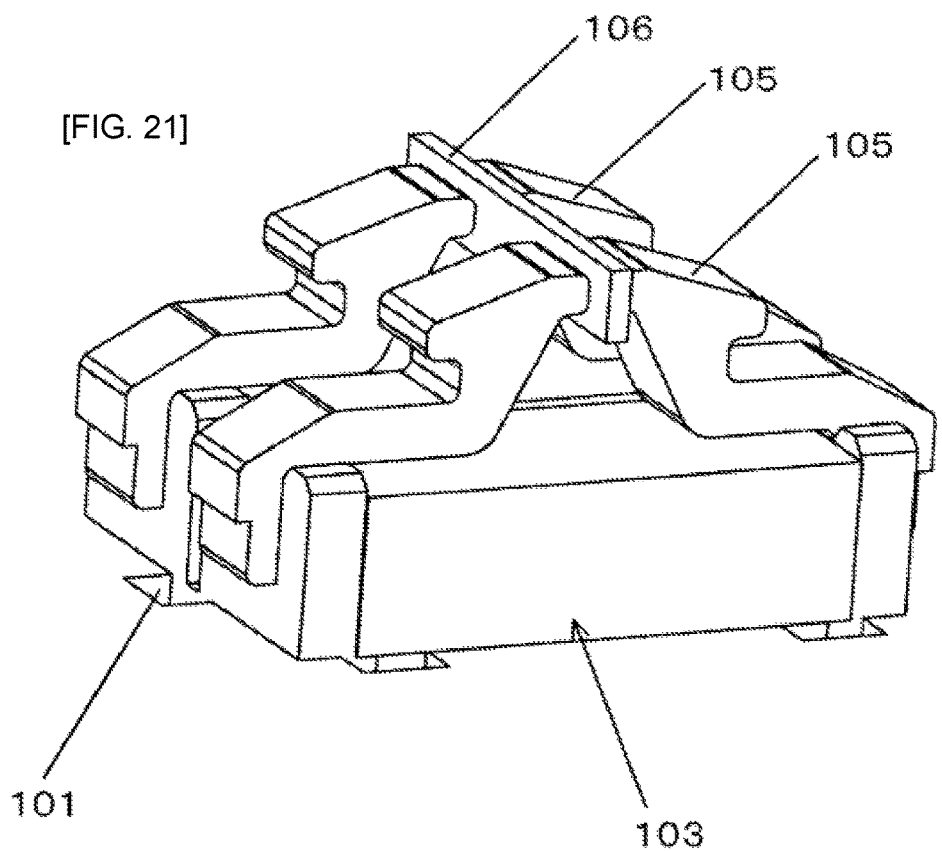
[FIG. 21]
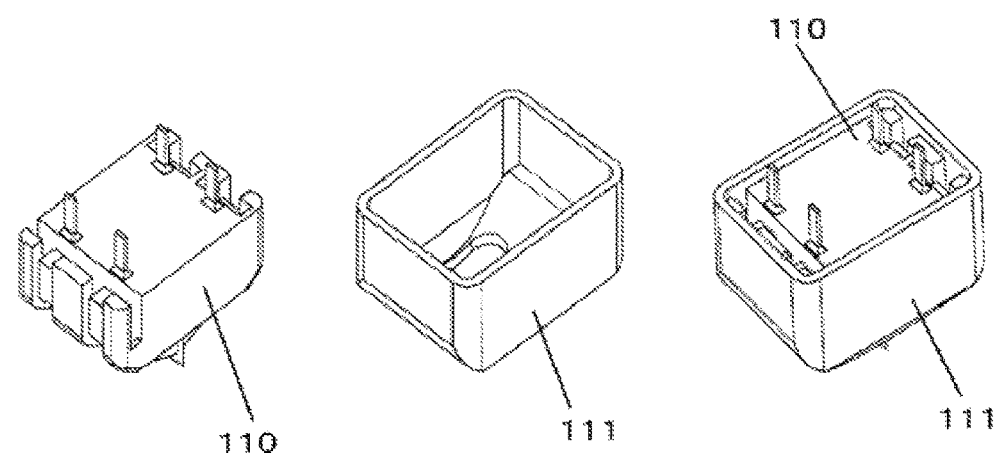
[FIG. 22A]  [FIG. 22B]  [FIG. 22C]

METHOD FOR MANUFACTURING MAGNETIC CORE MODULE IN MAGNETIC HEAD, MAGNETIC CORE MODULE IN MAGNETIC HEAD AND MAGNETIC HEAD

CROSS-REFERENCE TO RELATED APPLICATIONS

This is a divisional application of U.S. patent application Ser. No. 14/647,565, filed May 27, 2015, which is a § 371 National Stage Application of International Application No. PCT/JP2013/081716 filed on Nov. 26, 2013, claiming the priority of Chinese Patent Application No. 201210493620.4 filed on Nov. 28, 2012, Chinese Patent Application No. 201220638765.4 filed on Nov. 28, 2012, Chinese Patent Application No. 201310014354.7 filed on Jan. 15, 2013, Chinese Patent Application No. 201320020392.9 filed on Jan. 15, 2013, Chinese Patent Application No. 201310388426.4 filed on Aug. 30, 2013, Chinese Patent Application No. 201320537401.1 filed on Aug. 30, 2013, Chinese Patent Application No. 201310388400.X filed on Aug. 30, 2013 and Chinese Patent Application No. 201320537468.5 filed on Aug. 30, 2013.

TECHNICAL FIELD

The present invention relates to the technical field of magnetic recording, and more particularly to a method of manufacturing a magnetic core module in a magnetic head, the magnetic core module in the magnetic head, and the magnetic head.

BACKGROUND ART

The magnetic head is an essential part in a magnetic card reader/writer and carries out conversion, which is the most important function, for recording or retrieving data between a system and the magnetic card. Recently, the magnetic head has found its application in various industries such as telephones utilizing magnetic cards, magnetic cards for readers/writers in the banking industry, attendance management systems, door security systems, fueling systems, cipher locks, and automatic ticket gate systems for subways.

Referring to a schematic structure diagram of the magnetic head illustrated in FIG. 1, the magnetic head includes a plurality of magnetic core groups 12, holders 11, windings 13, gap spacers 14, a shielding case 15, and connecting terminals 16. The method of assembling the magnetic head in the prior art includes: stacking respectively independent magnetic cores on a plurality of the magnetic core groups 12 to hold them in a slot formed in a holder 11; mounting the windings 13 to the lower part of the holder 11 and a gap spacer 14 to the upper part of the holder 11 to form the magnetic head of which the structure is similar to that of a transformer; covering them with the shielding case 15; passing setscrews (not shown) through setscrew holes 17 formed on sides of the shielding case 15 for fastening; filling a remaining space in the shielding case 15 with resins (not shown); and exposing the connecting terminals 16 of the windings 13.

The magnetic core group is the most important part for the magnetic head, and an assembly process of the magnetic core group is an essential process having an effected on the product quality and the production efficiency of the magnetic head. One magnetic head typically requires two or more magnetic core groups, and each of the magnetic core groups is formed with a plurality of the respectively independent magnetic cores. The specific quantity of the magnetic core group is determined from the shape or thickness of the magnetic core, or the specification of the product. The respectively independent magnetic cores are sheet-like parts and have small dimensions. Thus, the magnetic cores need to be fixed by the holder so as to be arranged properly and not to be deformed after being formed into the magnetic core groups. Referring to a schematic structure diagram of the magnetic core group illustrated in FIG. 2 after assembly in accordance with traditional assembly processes in the prior art, the magnetic core group 12 is typically held by the holder 11 of metal to form the magnetic core module in the prior art. The assembly process of the magnetic core module in the entire assembly processes of the magnetic head is as follows. That is, a worker uses a tool such as tweezers to pick up a specific quantity of the respectively independent magnetic cores and insert them into the slot for the magnetic cores in the holder 11, and then the worker uses a pressure-applying machine to push the magnetic core group 12 in the holder 11. Thus, the magnetic core group 12 is assembled to the holder 11, and the assembly of the magnetic core module is completed.

A fixing method of this magnetic core group is disclosed in the Prior Art section of the Patent Document 1. That is, the magnetic head is formed with two symmetrical magnetic cores (1a, 1b), two magnetic core holders (2a, 2b), and two magnetic shielding plates (6a, 6b), and its production method includes assembling the cores and the shielding plates of which the numbers are equal to those of the plurality of the channels respectively into two core holders, positioning the cores, and then holding the cores by crimping, welding, or bonding with resin.

PRIOR ART DOCUMENT

Patent Document

Japanese Patent Application Publication No. Hei 5-020621

SUMMARY OF THE INVENTION

Problem to be Solved by the Invention

However, the process for assembling the magnetic core group and the holder in the prior art has many tasks that require involvement by the worker and therefore has poor production efficiency. Furthermore, the magnetic core group and the holder are individually formed into the shape, and the stacking of a plurality of the magnetic cores exhibits a wide range of thickness variation of a whole. Thus, a defective phenomenon easily occurs such that the magnetic cores are littered, misaligned, or cannot be pushed into the slot when the magnetic core group is assembled into the slot for the magnetic core in the holder, and this causes a degradation in a rate of good product for the magnetic head.

Therefore, the present invention is made in view of the circumstance described above and intended to reduce the tasks in which the worker is involved, improve the production efficiency, prevent the occurrence of the defective phenomenon such as a litter or misalignment of the magnetic cores, and increase the rate of good product for the magnetic head.

Means for Solving the Problems

The present invention is intended to solve the technical problems and to provide a method of manufacturing a magnetic core module in a magnetic head, the magnetic core module in the magnetic head, and the magnetic head that can effectively simplify the production processes of the magnetic head, improve the efficiency, and reduce the production cost.

In order to solve the problems described above, a production method of the magnetic core module in the magnetic head is provided, including: disposing a magnetic core group as an insert in a holder mold cavity; and performing injection molding to the holder mold cavity.

The present invention preferably includes a process of welding the cores relating to the magnetic core group with a laser beam by means of laser beam welding technique before the magnetic core group is disposed in the holder mold cavity.

In the production method of the magnetic core module in the magnetic head described above, the present invention preferably includes a process of detecting, with an optical detector, whether the magnetic core group is placed at a specified position in the holder mold cavity or not.

In the production method of the magnetic core module in the magnetic head described above, the present invention preferably includes a process of detecting, using a manner of sensing by mechanical contact, whether the magnetic core group is placed at a specified position in the holder mold cavity or not.

Specifically, the process of performing injection molding to the mold cavity described above preferably employs a vertical and mold rotating type injection molding machine to conduct the injection molding to the mold cavity.

Furthermore, the present invention provides the magnetic core module where the magnetic core group and the holder are molded in one piece.

The magnetic core group of the magnetic core module is preferably formed through the laser beam molding of a plurality of independent magnetic cores.

In addition, the present invention provides the magnetic head including the magnetic core module described above, the windings, the gap spacer, the shielding case, and the connecting terminals drawn from the windings.

The magnetic core group of the magnetic head is preferably formed through the laser beam molding of a plurality of independent magnetic cores before it is formed through the injection molding with the holder in one piece.

A conductive member is preferably interposed between the magnetic core group of the magnetic head and the shielding case.

Effect of the Invention

The present invention has the following advantages as compared with the prior art.

In the production method of the magnetic core module provided in accordance with the present invention, the magnetic core group is used as the insert, and the magnetic core group and the holder are formed through the injection molding in one piece, using the injection molding method. Therefore, the present invention can, not only simplify the production process of the magnetic head and improve the production efficiency, but also save labor and production costs, prevent the defective phenomenon such as the litter or misalignment of the magnetic cores which easily occurs during the assembly of thin and small magnetic cores, and ensure an ideal rate of good product.

BRIEF DESCRIPTION OF THE DRAWINGS

FIG. 1 is a schematic structure diagram of the magnetic head in the prior art.

FIG. 2 is a schematic structure diagram of the magnetic core group after assembly in accordance with traditional assembly processes in the prior art.

FIG. 3 is a flow chart of the production method of the magnetic core module in the magnetic head according to the embodiment 1 of the present invention.

FIG. 4 is a conceptual diagram showing the arrangement of equipment used for the laser beam welding according to the embodiment 1.

FIG. 5 is a schematic structure diagram showing the configuration of a core loading jig according to the embodiment 1.

FIG. 6 shows a schematic view showing the alignment of a core alignment jig and cores according to the embodiment 1, and an enlarged view showing the aligned state of the cores on the core alignment jig according to the embodiment 1.

FIG. 7 is a schematic view showing laser beam welding points of the magnetic cores according to the embodiment 1.

FIG. 8 is a plan view of the assembly jig used in the production method of the magnetic core module according to the embodiment 1 of the present invention.

FIG. 9 is a schematic view showing the configuration of a vertical and mold rotating type injection molding machine according to the embodiment 1.

FIG. 10 is a schematic view showing the configuration of the vertical and mold rotating type injection molding machine according to the embodiment 1.

FIG. 11 is a schematic view showing the configuration of a lower mold of the metal mold according to the embodiment 1.

FIG. 12 is a schematic view showing the configuration of the magnetic core module according to another embodiment.

FIG. 13 is a cross-sectional view showing the configuration of the magnetic core module according to another embodiment.

FIG. 14 is a cross-sectional view showing the configuration of the magnetic head according to another embodiment.

FIG. 15 is a schematic view showing the metal spacer according to another embodiment.

FIG. 16 is a schematic view showing the state in which the metal spacer is welded to the magnetic core module according to another embodiment.

FIG. 17 is a cross-sectional view showing the configuration of the magnetic head according to another embodiment.

FIG. 18 is a schematic view showing the state in which the conductive coating is coated over the magnetic core module according to another embodiment.

FIG. 19 is a flow chart of the production method of the magnetic head according to the embodiment 2 of the present invention.

FIG. 20 is a conceptual diagram showing a lower mold cavity and a right slide nest according to the embodiment 2.

FIG. 21 is an enlarged schematic view of the insert according to the embodiment 2.

FIGS. 22A, 22B and 22C are schematic views showing the assembly method of the magnetic head module and the shielding case according to the embodiment 2, in which FIG. 22A is a schematic view showing the magnetic head module, FIG. 22B is a schematic view showing the shielding case, and FIG. 22C is a schematic view showing the assembled state of the magnetic head module and the shielding case.

BEST MODE FOR CARRYING OUT THE INVENTION

The present invention includes a process for disposing the magnetic core group in the holder mold cavity as the insert and a process for performing injection molding into the holder mold cavity. Therefore, the present invention can, not only simplify the production process of the magnetic head and improve the production efficiency, but also save labor and production costs, prevent the defective phenomenon such as the litter or misalignment of the magnetic cores which easily occurs during the assembly of thin and small magnetic cores, and ensure an ideal rate of good product.

Embodiment 1

Embodiments according to the present invention will be described hereinafter in detail with reference to the attached drawings. However, components described in the embodiments are merely illustrative and not intended to limit the scope of the present invention therein.

First, an embodiment is described about the production method of the magnetic core module in the magnetic head provided by the present invention. Referring to FIG. 3, FIG. 3 is a flow chart of the production method of the magnetic core module in the magnetic head according to this embodiment of the present invention which includes the following processes.

Process 31: Using a laser beam welding technique, welding separate magnetic cores with a laser beam, and integrating into one-chip form.

This Process 31 is described in detail below. In this embodiment, the welding is conducted, using a YAG laser beam welding machine, under a condition of a pulse width: 0.9 (ms), maximum average efficiency: 4.5 (w), welding frequency: 14.5 (Hz), and a heat quantity: 2.4 (J). However, this welding condition may be changed as long as it falls within tolerance on the electrical performance of the magnetic head.

A concrete description is made next with reference to the drawings. FIG. 4 is a conceptual diagram showing the arrangement of equipment used for the laser beam welding. A separate magnetic core 62 is transported from a parts feeder 68 through a core carrier 69 to a core loading jig 70 (see FIG. 5). This core loading jig 70 moves on guide rails 71. Core alignment jigs 72, 73 extendably driven by cylinders (=actuators, not shown) push the respective magnetic cores 62 placed on the core loading jig 70 in vertical and horizontal directions to align the displacement of the cores within the range of 0.015 mm (see FIG. 6). At that time, an optical detector (not shown) including a CCD camera 74 is used to monitor the alignment state and the stacking state of the cores.

Specifically, the optical detector is an information processor having an imaging means such as the CCD camera 74, a storing means such as a hard disk drive, and a control means such as a CPU. The phrase "to monitor the alignment state and the stacking state of the cores" means that an image of the group of magnetic cores 62 placed on the core loading jig 70 is taken by the imaging means, and the control means retrieves imaging data stored in the storing means and representing the correct number and the correct positional relation of the cores, compares the imaging data taken by the imaging means with the imaging data retrieved from the storing means, and determines whether the number and the position of the magnetic cores 62 placed on the core loading jig 70 are correct or not. If the optical detector determines that the number or the position of the magnetic cores 62 is incorrect, the optical detector allows the display means (not shown) such as a display to indicate the incorrectness or activates an alarm, for example.

If the optical detector determines that the number or the position of the magnetic cores 62 is correct, a laser generator 75 emits a laser beam from a laser beam irradiation nozzle 76 and welds the magnetic cores 62. At this time, the optical detector detects the position and the quality of the laser beam welding. Specifically, the image of the group of magnetic cores 62 placed on the core loading jig 70 is taken by the imaging means, and the control means retrieves the imaging data stored in the storing means and representing the correct position of the welding and the correct welding state, compares the imaging data taken by the imaging means with the imaging data retrieved from the storing means, and determines whether the welding position and the welding state of the magnetic cores 62 placed on the core loading jig 70 are correct or not. If the optical detector determines that the welding position or the welding state of the magnetic cores 62 is incorrect, the optical detector allows the display means (not shown) such as a display to indicate the incorrectness or activates an alarm, for example.

Although the laser beam welding causes a part of the magnetic cores 62 that irradiated by the laser beam to be dented as a laser beam welding indentation, the depth of the laser beam welding indentation is desired to be within 0.2 mm. However, the deeper laser beam welding indentation may be acceptable in some cases depending on the shape of the magnetic cores 62.

The method of the laser beam welding includes welding between the magnetic cores 62 where the number of the magnetic cores 62 is one less than that of the magnetic cores 62 required for integration into one-chip form so that the specified number of the magnetic cores 62 is consequently integrated into one-chip form when the magnetic cores 62 are removed from the core loading jig 70. The "welding between the magnetic cores 62 where the number of the magnetic cores 62 is one less than that of the magnetic cores 62 required for the integration into one-chip form" is described below with reference to FIG. 7. In case that seven separate magnetic cores 62 are welded to be integrated into one-chip form, for example, since the number of the portions between the magnetic cores 62 are six, the six portions are welded. In this way, after the welding is completed at the six portions, a next portion to the welded magnetic cores 62 is not welded, but the welding is started again from a next portion to the unwelded magnetic core 62. Thus, continuous production is made possible, and the efficiency can be enhanced. In this embodiment, a configuration is described where a part of points between the magnetic cores 62 (more specifically, three points at an upper, a lower, and a front parts between the magnetic cores 62 in FIG. 7) is welded with the laser beam. However, the present invention is not limited to this configuration and may include welding in a continuous manner rather than welding the points between the magnetic cores 62. Furthermore, even though the present invention includes welding a part of the points between the magnetic cores 62 with the laser beam, it does not necessarily require welding three points at the upper, the lower, and the front parts with the laser beam, but may include welding two or more points irrespective of the direction, with the laser beam.

Process 32: Disposing the magnetic core group integrated into one-chip form in the holder mold cavity as the insert.

In the embodiment of the present invention, an assembly jig 40 shown in FIG. 8 is employed in order to accurately dispose the group of magnetic cores 62 in the mold cavity. Referring to a plan view of the assembly jig 40 used in the production method of the magnetic core module according to the present invention shown in FIG. 8, a plurality of magnetic core group assembly holes 41 are formed in one regular panel. The magnetic core group assembly holes 41 are used to hold the group of magnetic cores 62, and the positions of the holes correspond to insert fixing positions in the mold cavity. The assembly jig 40 shown in FIG. 8 is provided for the mold cavity where eight magnetic core modules can be assembled in one mold. That is, eight magnetic core modules can be produced by performing injection molding in the mold cavity where the inserts (=the group of magnetic cores 62) are disposed, and all the magnetic core modules include the magnetic core group and the holder both molded in one piece.

This Process 32 through a Process 34 described later are conducted using a vertical and mold rotating type injection molding machine 85 shown in FIG. 9. In this vertical and mold rotating type injection molding machine 85, tasks are performed when a lower mold 87 (=a mold on a lower side of a metal mold) placed on a rotary table 86 is moved to three positions in the order of a magnetic core group inserting position, an assembly jig removing position, and an injection position. The imaging means such as the CCD camera is provided above the lower mold 87, and the imaging means is connected to the control means of the optical detector (not shown).

In this embodiment, the configuration that uses the vertical and mold rotating type injection molding machine 85 where the tasks are performed during the movement to three positions in the order of the magnetic core group inserting position, the assembly jig removing position, and the injection position is described; however, the present invention is not limited to this configuration. The injection molding may be performed by means of an injection molding machine with any other number of positions such as one or two position(s). The difference between the positions is just the efficiency.

The concrete description about the Process 32 is made next with reference to FIGS. 10 and 11. A parts feeder 88 is used to align the group of magnetic cores 62 in a given direction, and a chute 89 is used to deliver the group to the lower mold cavity 90 (=holder mold cavity). The aforementioned assembly jig 40 is arranged on the lower mold cavity 90. Each group of magnetic cores 62 is held in each magnetic core group assembly hole 41 of the assembly jig 40 by means of a core extrusion device 91, a core extruding cylinder 92, and a core extrusion pin 93. Each magnetic core group assembly hole 41 corresponds to the insert fixing position in the lower mold cavity 90. Then, the rotary table 86 is rotated to move the lower mold 87 to the assembly jig removing position, and the assembly jig 40 is removed.

The optical detector detects whether the group of magnetic cores 62 is placed at the insert fixing position in the holder mold cavity or not. That is to say, the optical detector is the information processor having the imaging means such as the CCD camera provided above the lower mold 87, the storing means such as a hard disk drive, and the control means such as a CPU. Furthermore, the optical detector allows the imaging means to take the image of the group of magnetic cores 62 placed at the insert fixing position in the lower mold cavity 90 and the control means to retrieve the imaging data stored in the storing means and representing the correct position, to compare the imaging data taken by the imaging means with the imaging data retrieved from the storing means, and to determine whether the group of magnetic cores 62 is correctly placed at the insert fixing position in the lower mold cavity 90 or not. If the optical detector determines that the position of the group of magnetic cores 62 is incorrect, the optical detector allows the display means such as a display to indicate the incorrectness or activates an alarm, for example.

In this embodiment, the configuration is described in which the optical detector is used to determine whether the group of magnetic cores 62 is correctly placed at the insert fixing position in the lower mold cavity 90 or not. However, the present invention is not limited to this configuration but may use a method of sensing by mechanical contact, for example. In other words, the present invention may be provided with a contact that is brought into contact with the group of magnetic cores 62 when the group of magnetic cores 62 is correctly placed at the insert fixing position in the lower mold cavity 90. The contact sends a signal to the information processor when detecting the contact with the group of magnetic cores 62. The information processor determines whether the group of magnetic cores 62 is correctly placed at the insert fixing position in the lower mold cavity 90 or not, depending on the presence or absence of the signal received from the contact.

Process 33: Injection molding to the holder mold cavity.

When the optical detector determines that the group of magnetic cores 62 is correctly placed at the insert fixing position in the lower mold cavity 90, the rotary table 86 is rotated to move the lower mold 87 to the injection position. The lower mold 87 is fitted with an upper mold (not shown), a material such as a plastic resin is injected into the holder mold cavity through an injection hole (not shown), and thus the injection molding is conducted.

The plastic resin is preferable for the injected material because it meets the requirements in which the material has high mechanical strength and a molding temperature that does not affect electromagnetic property of the magnetic core 62. For example, the plastic material contains PPS-(GF+GB) as the resin material which includes polyethylene sulfur ether and 60% glass fiber.

Process 34: Obtaining the magnetic core module where the magnetic core group and the holder are molded in one piece after cooling.

The Process 33 is an insert molding process. The insert molding refers to a molding method for producing an integrated product, which includes attaching a prepared insert of different material in the mold, and then injecting the resin, joining and hardening the molten material and the insert.

The insert may be any different kind of articles such as a cable, a plug, a spring, or a nut. Fitting the metal insert into an injection-molded finished product enhances the strength of the plastic finished product as well as increases the applied effect of the finished product such as improvements of conductivity or convenience of the connection with other parts, for example. The technique in relation to the principle and characteristics of the insert molding technique described above has been introduced to the assembly of the magnetic core group and the holder of the present invention, and thus the assembly of the magnetic core group and the holder is achieved using integral molding with a metal mold.

According to the above description, the holder is not necessarily produced as a separate part when the production method of the magnetic core module is employed for the magnetic head according to the present invention. The injection molding enables the holder and the insert to be combined tightly as well as eliminates a pushing process, and therefore a lot of manual works and materials can be saved, and production efficiency increases. The holder in the prior art has been produced from metal materials; however, the holder according to the present invention is formed from plastic, and therefore the production cost of the product can be saved effectively.

Furthermore, the present invention includes the process of welding the separate magnetic cores with the laser beam, and thus the occurrence of a defective condition such as the litter or misalignment of the magnetic cores before the injection molding using the magnetic core group can be effectively prevent, and the rate of good product can be improved more. The present invention also includes the process of determining whether the magnetic core group as the insert is placed at the specified position in the holder mold cavity before the injection molding process or not, and thus the rate of good product can be ensured.

In this embodiment, the configuration is described in which the separate magnetic cores are welded with the laser beam to be integrated into one-chip form and the magnetic core group integrated into one-chip form is placed as the insert in the holder mold cavity. However, the present invention is not limited to this configuration but may include the configuration where the separate magnetic core group is placed as the insert in the holder mold cavity without laser beam welding. In this case, the worker manually places the specified number of separate magnetic cores in the holder mold cavity, for example. Alternatively, a jig (not shown) is used to align the separate cores, and a robot arm is used to hold the specified number of cores to place them in the mold cavity.

Although the embodiment of each method described above has been described as a combination of a series of processes for the convenience of explanation, it should be realized by those ordinarily skilled in the art that the present invention is not limited to the order of the processes described herein. This is because a part of the processes may employ different order or the processes may be conducted simultaneously in accordance with the present invention. In addition, those ordinarily skilled in the art should realize that all the embodiments described herein are preferable examples and the processes and the configuration described in the embodiments are not absolute necessities for the present invention.

In relation to the production method of the magnetic core module in the magnetic head described above, the present invention is provided through the production method described above. The present invention also provides the magnetic core module where the magnetic core group is placed in the holder mold cavity and the holder formed through the injection molding in one piece is an injection molded product. The magnetic core group and the holder are formed in one piece through the injection molding, and the tolerance of outer dimensions is ±0.03 mm without deformation and burr. An exposed surface of the magnetic core group is not necessarily covered with resin. The tolerance of positional dimensions of the magnetic core group is ±0.02 mm, and the perpendicularity deviation between a side face of the magnetic core group and a bottom face of the holder is within 20'. In the next process for producing the magnetic head, an upper end face of the magnetic core group requires polishing. Thus, the bottom face of the holder is set as a fixed reference plane, and the flatness is required to be within the range of 0 to 0.005 mm.

It is preferred that the magnetic core group in the magnetic core module is welded with the laser beam beforehand and injection-molded as the insert with the holder in one piece.

In addition, the present invention provides the magnetic head including the magnetic core module, the windings, the gap spacer, the shielding case, and the connecting terminals drawn from the windings in which the magnetic core module is formed through the injection molding of the magnetic core group as the insert and the holder in one piece. The method of assembling the magnetic head includes: forming the magnetic core group and the holder in one piece through the injection molding; mounting the windings and a gap spacer to the lower part and the upper part of the holder, respectively, to form the magnetic head of which the structure is similar to that of a transformer; covering them with the shielding case; passing the setscrews through the setscrew holes formed on sides of the shielding case for fastening; filling the remaining space in the shielding case with resins; and exposing the connecting terminals of the windings.

Before the magnetic core group in the magnetic core module is formed with the holder in one piece through the injection molding, a plurality of independent magnetic cores included in the magnetic core group are preferably welded using the laser beam welding technique. Accordingly, the defective phenomenon such as the litter or misalignment of the magnetic cores which easily occurs during the assembly of thin and small magnetic cores can be prevented.

The magnetic head usually requires to connect from the magnetic core to a ground (=or an earth) between the shielding cases, and the grounding resistance value takes various values but is typically 5 to 10 ($\Omega$) or less. That is to say, conductivity should be ensured from the metal magnetic core group to the metal shielding case. However, the present invention includes forming the magnetic core group and the holder in one piece through the injection molding, and the resin holder cannot ensure the conductivity and connect to the ground. Thus, the applicant has provided a plurality of opening windows 127 on the side of the holder 120 as shown in FIGS. 12 and 13 and allowed a part of the group of magnetic cores 121 to protrude about 0.05 mm from the opening windows 127. As shown in FIG. 14, the applicant has considered to bring a metal retaining spring 122 for retaining the group of magnetic cores 121 into contact with the protruding portion of the group of magnetic cores 121 and also bring a tip of the retaining spring 122 into contact with the shielding case 123 so as to connect to the ground. However, in the case of the magnetic core module having three or more groups of the magnetic cores 121, an error has developed in the flatness and the contact between the retaining spring 122 and the group of magnetic cores 121 lost the stability.

Thus, the present invention preferably includes either or both of the following two processes in order to ensure the conductivity between the group of magnetic cores 121 and the shielding case 123. One process is of placing a nonmagnetic metal spacer 124 between the group of magnetic cores 121 and the retaining spring 122 as shown in FIGS. 15, 16, and 17. More specifically, the metal spacer 124 and the group of magnetic cores 121 are joined by laser beam welding, for example, and three groups of magnetic cores 121 are formed in one piece through the metal spacer 124. Then, the retaining spring 122 is brought into contact with the metal spacer 124, and the tip of the retaining spring 122 is brought into contact with the shielding case 123. As a result, grounding between the group of magnetic cores 121 and the shielding case 123 has been made available.

The other process is of coating the surfaces of the holder 120 and the group of magnetic cores 121 protruded with a conductive coating 125 as shown in FIG. 18. For example, formulation of a low-resistance silver-copper alloy, which is widely used as electromagnetic shielding, and a binder (bonding agent) is used for the conductive coating 125. That is, the holder 120 and the group of magnetic cores 121 are formed in one piece with the conductive coating 125, the retaining spring 122 is brought into contact with the group of magnetic cores 121 in one-piece form, and the tip of the retaining spring 122 is brought into contact with the shielding case 123. As a result, grounding between the group of magnetic cores 121 and the shielding case 123 has been made available.

Both two processes described above can cause to bring the plurality of the groups of magnetic cores 121 formed in one piece into conductive state when the retaining spring 122 is brought into contact with any part of the metal spacer 124 or the conductive coating 125 and achieve the grounding of the plurality of the groups of magnetic cores 121 formed in one piece when the tip of the retaining spring 122 is brought into contact with the shielding case 123.

In order to ensure the conductivity between the group of magnetic cores 121 and the shielding case 123, the configurations that use the metal spacer 124 and the retaining spring 122, and the retaining spring 122 and the conductive coating 125 are described herein. However, the present invention is not limited to those configurations and may include the configuration that a conductive member is interposed between the group of magnetic cores 121 and the shielding case 123.

Embodiment 2

The above Embodiment 1 has been described about the configuration that the magnetic cores and the holder are formed in one piece through injection molding. In this Embodiment 2, configurations for obtaining the magnetic head module through the injection molding of the magnetic core group, the windings, and the gap spacer as the insert with the holder in one piece and for obtaining the magnetic head through the injection molding of the magnetic head module and the shielding case in one piece are described.

FIG. 19 is a flow chart of the production method of the magnetic head according to this embodiment of the present invention and includes the following processes.

Process 191: Using a laser beam welding technique, welding separate magnetic cores with a laser beam, and integrating into one-chip form.

The Process 191 is similar to the Process 31 described above, and thus its description is not repeated.

Process 192: Polishing the upper end face of the magnetic core group integrated into one-chip form.

When the bottom face of the holder is set as the fixed reference plane, the upper end face of the magnetic core group integrated into one-chip form is polished so as to achieve the flatness within the range of 0 to 0.005 mm.

Process 193: Disposing the magnetic core group integrated into one-chip form, the windings, and the gap spacer as the insert in a first mold cavity.

FIG. 20 shows a conceptual diagram of the lower mold cavity 101 and a nest 104 of a right slide employed in this embodiment in which the lower mold cavity 101, a gate position 102, the insert 103, and the nest 104 of the right slide are illustrated. FIG. 21 shows an enlarged schematic view of the insert 103 indicated by the part A in FIG. 20. The insert 103 is formed with the group of magnetic cores 105, the windings (not shown), and a gap spacer 106.

Details of the Process 193 are as follows. When the group of magnetic cores 105 is placed in the feeder, the feeder delivers the group of magnetic cores 105 to material alignment rails. The material alignment rails include two rails, and right and left groups of magnetic cores 105 are faced each other on the material alignment rails. A material pusher pushes the groups of magnetic cores 105 to the assembly position at the end of the material alignment rails. The worker arranges the windings on the jig where the materials are placed, and the windings are delivered to the assembly position along the rails. A material belt of the gap spacer 106 is used to carry the gap spacer 106 in the manner of a pressed material feed and cut after the assembly. Next, the robot arm takes the combination of the group of magnetic cores 105, the windings, and the gap spacer 106, move it above the lower mold along the rails, and inserts it to the insert fixing position in the lower mold cavity 101 of a first mold (=first mold cavity).

The optical detector then detects whether the insert formed with the group of magnetic cores 105 integrated into one-chip form, the windings, and the gap spacer 106 is placed at the insert fixing position in the lower mold cavity 101 of the first mold or not. That is to say, the optical detector is the information processor having the imaging means such as the CCD camera provided above the lower mold, the storing means such as a hard disk drive, and the control means such as a CPU. Furthermore, the optical detector allows the imaging means to take the image of the insert placed at the insert fixing position in the lower mold cavity 101 and the control means to retrieve the imaging data stored in the storing means and representing the correct position, to compare the imaging data taken by the imaging means with the imaging data retrieved from the storing means, and to determine whether the insert is correctly placed at the insert fixing position in the lower mold cavity 101 or not. If the optical detector determines that the position of the insert is incorrect, the optical detector allows the display means such as a display to indicate the incorrectness or activates an alarm, for example.

In this embodiment, the configuration is described in which the optical detector is used to determine whether the insert is correctly placed at the insert fixing position in the lower mold cavity 101 or not. However, the present invention is not limited to this configuration but may use a method of sensing by mechanical contact, for example. In other words, the present invention may be provided with a contact that is brought into contact with the insert when the insert is correctly placed at the insert fixing position in the lower mold cavity 101. The contact sends a signal to the information processor when detecting the contact with the insert. The information processor determines whether the insert is correctly placed at the insert fixing position in the lower mold cavity 101 or not, depending on the presence or absence of the signal received from the contact.

If the optical detector determines that the position of the insert is correct, the upper mold of the first mold drives the right slide to move it to the center. The upper mold and the nests of the right and left slide conduct positioning of the insert together in three directions and ensure the assembling accuracy of the insert.

Process 194: Injecting the material such as a plastic resin into the first mold cavity.

That is, the resin is injected into the first mold cavity via the gate position 102. The plastic resin is preferable for the injected material because it meets the requirements in which the material has high mechanical strength and a molding temperature that does not affect the electromagnetic property of the magnetic core. For example, the plastic material contains PPS-(GF+GB) as the resin material which includes polyethylene sulfur ether and 60% glass fiber.

Process 195: Obtaining the magnetic head module where the magnetic core group 105, the windings, the gap spacer 106, and the holder are molded in one piece after cooling.

Process 196: Setting the magnetic head module into the shielding case.

FIG. 22 is schematic views showing the assembly method of the magnetic head module 110 and the shielding case 111 in the production processes of the magnetic head. The magnetic head module 110 shown in FIG. 22A is placed in the shielding case 111 shown in FIG. 22B, and thus the assembly of the magnetic head module 110 and the shielding case 111 shown in FIG. 22C is formed. In the actual production processes, the worker may manually place the magnetic head module 110 in the shielding case 111, or the magnetic head module 110 may be placed in the shielding case 111 by means of a dedicated jig. Then, the assembled magnetic head module 110 and shielding case 111 are arranged on the loading jig, and the loading jig moves on material transport rails and delivers the assembled magnetic head module 110 and shielding case 111 to the specified position.

Process 197: Placing the assembled magnetic head module 110 and shielding case 111 as the insert in a second mold cavity. The optical detector detects whether the insert including the magnetic head module 110 and the shielding case 111 is placed at the insert fixing position in the lower mold cavity of a second mold or not. In this embodiment, the configuration is described in which the optical detector is used to determine whether the insert is correctly placed at the insert fixing position in the lower mold cavity or not. However, the present invention is not limited to this configuration but may use a method of sensing by mechanical contact, for example.

Process 198: Injecting the material such as a plastic resin into the second mold cavity when the optical detector determines that the position of the insert is correct.

Process 199: Obtaining the magnetic head where the magnetic head module and the shielding case are molded in one piece after cooling.

In this embodiment as described above, a single-piece magnetic head module is first obtained by means of the injection molding technique, and then a single-piece magnetic head is obtained with the magnetic head module and the shielding case molded in one piece as the insert by means of the injection molding technique. Therefore, the present invention can achieve the reduction of unevenness in performance of the magnetic head due to operational errors by a worker, savings of labor costs, and the improvement of production efficiency of the magnetic head.

The magnetic head requires to ensure the conductivity between the metal magnetic core group and the shielding case. However, the present invention includes forming the magnetic core group, the windings, the gap spacer, and the holder in one piece through injection molding and forming the magnetic head module and the shielding case in one piece through injection molding, and the resin holder and shielding case cannot ensure the conductivity and connect to the ground. Thus, a metal member may be interposed between the magnetic core group and the shielding case, for example. Alternatively, the conductive coating may be coated over the surfaces of the magnetic head module and the shielding case. As a result, grounding between the magnetic core group and the shielding case is made available.

The embodiments according to the present invention are progressively described herein, and each embodiment is described, focusing on the different parts from other embodiments. Thus, the same or similar part in the embodiments may be cross-referenced. The embodiments relating to the system (device) are basically similar to those relating to the method, and thus relating parts may be referred to the description of the embodiments relating to the method.

In the above description, the production method of the magnetic core module in the magnetic head, the magnetic core module in the magnetic head, and the magnetic head including the magnetic core module all provided according to the present invention are described in detail, and the specific examples are used herein to describe the principle and the embodiments of the present invention. The above description of the embodiments is useful for understanding the method and the core idea of the present invention, and those ordinarily skilled in the art may put the specific example and modification into practice. Therefore, it should be understood that the contents of this specification are not intended to limit the scope of the present invention.

DESCRIPTION OF REFERENCE NUMERALS AND SYMBOLS

11: holder, 12: magnetic core group, 13: windings, 14: gap spacer, 15: shielding case, 16: connecting terminal, 17: setscrew hole,
40: assembly jig, 41: assembly hole,
62: magnetic core, 68: parts feeder, 69: core carrier, 70: core loading jig, 71: guide rail, 72: core alignment jig, 73: core alignment jig, 74: CCD camera, 75: laser generator, 76: laser beam irradiation nozzle, 77: X-direction stopper, 78: X-direction pressurizing block, 79: Y-direction stopper, 80: Y-direction pressurizing block, 81: jig base,
85: vertical and mold rotating type injection molding machine, 86: rotary table, 87: lower mold,
88: parts feeder, 89: chute, 90: lower mold cavity, 91: core extrusion device, 92: core extruding cylinder, 93: core extrusion pin, 94: assembly jig movement cylinder, 95: upper mold and material injection nozzle mounting port,
101: lower mold cavity, 102: gate position, 103: insert, 104: nest, 105: magnetic core group, 106: gap spacer, 110: magnetic head module, 111: shielding case,
120: holder, 121: magnetic core, 122: retaining spring, 123: shielding case, 124: metal spacer,
125: conductive coating, 127: opening window

The invention claimed is:

1. A magnetic head comprising a magnetic core module and a shield case housing the magnetic core module, the magnetic core module comprising:
   a magnetic core group disposed as an insert in a holder mold cavity of a holder, the magnetic core group comprising magnetic cores welded together with a laser beam by means of a laser beam welding technique before the magnetic core group is disposed in the holder mold cavity, and the magnetic core group being disposed at a specified position in the holder mold cavity, an optical detector having detected the magnetic core group to be at the specified position in the holder mold cavity;
   wherein the magnetic core group and the holder are formed in one piece through injection molding a plastic resin to the holder mold cavity containing the magnetic core group, a plurality of opening windows being provided on a side of the holder; and
   wherein a conductive member is interposed in the opening windows between magnetic cores exposed in the opening windows and the shield case, so as to connect to ground.

2. The magnetic head according to claim 1, wherein the magnetic core group is formed through laser beam welding of a plurality of independent said magnetic cores.

3. The magnetic head according to claim 2, further comprising: windings; a gap spacer; and connecting terminals drawn from the windings.

4. The magnetic head according to claim 2, wherein the conductive member is a retaining spring pressing both the magnetic core group and the shield case.

5. The magnetic head according to claim 4, wherein a nonmagnetic metal spacer is between the magnetic core group and the retaining spring.

6. The magnetic head according to claim 1, further comprising: windings; a gap spacer; and connecting terminals drawn from the windings.

7. The magnetic head according to claim 1, wherein the conductive member is a retaining spring pressing both the magnetic core group and the shield case.

8. The magnetic head according to claim 7, wherein a nonmagnetic metal spacer is between the magnetic core group and the retaining spring.

9. The magnetic head according to claim 8, wherein said retaining spring is conductive, and there is a respective said conductive retaining spring pressing both the magnetic core group and the shield case, so as to connect to ground and the nonmagnetic metal spacer and said plurality of opening windows being provided on opposing sides of the holder.

10. The magnetic head according to claim 7, wherein surfaces of the holder and the magnetic core group have a conductive coating and the retaining spring contact with the group of magnetic cores and a tip of the retaining spring contacts the shield case thereby providing grounding between the magnetic core group and the shield case.

11. The magnetic head according to claim 1, wherein surfaces of the holder and the magnetic core group have a conductive coating.

12. A magnetic head comprising a magnetic core module and a shield case housing the magnetic core module, the magnetic core module comprising:
  a magnetic core group disposed as an insert in a holder mold cavity of a holder, the magnetic core group comprising magnetic cores welded together with a laser beam by means of a laser beam welding technique before the magnetic core group is disposed in the holder mold cavity, and the magnetic core group being disposed at a specified position in the holder mold cavity, an optical detector having detected the magnetic core group to be at the specified position in the holder mold cavity;
  wherein the magnetic core group and the holder are formed in one piece through injection molding a plastic resin to the holder mold cavity containing the magnetic core group, a plurality of opening windows being provided on a side of the holder; and
  comprising a conductive retaining spring pressing both the magnetic core group and the shield case, so as to connect to ground and a nonmagnetic metal spacer between the magnetic core group and the retaining spring, the retaining spring in contact with the metal spacer and a tip of the retaining spring in contact with the shield case to ground between the magnetic core group and the shield case.

13. The magnetic head according to claim 12, wherein surfaces of the holder and the magnetic core group have a conductive coating.

* * * * *